United States Patent [19] [11] 4,229,010
St. Laurent, Jr. [45] Oct. 21, 1980

[54] SELF-ALIGNING SHAFT SEAL
[75] Inventor: Wilfred H. St. Laurent, Jr., Marblehead, Mass.
[73] Assignee: Bellofram Corporation, Burlington, Mass.
[21] Appl. No.: 971,615
[22] Filed: Dec. 20, 1978
[51] Int. Cl.³ .............................................. F16J 15/52
[52] U.S. Cl. ............................... 277/30; 277/212 FB; 74/18.1
[58] Field of Search ................. 277/30, 212 R, 212 C, 277/212 FB; 74/18.1, 18, 18.2

[56] References Cited
U.S. PATENT DOCUMENTS

| 1,959,259 | 5/1934 | Zerk | 74/18 X |
|---|---|---|---|
| 2,050,702 | 8/1936 | Jackson | 74/18.2 X |
| 2,323,569 | 7/1943 | Rzeppa | 74/18.1 X |
| 2,510,362 | 6/1950 | Anderson | 74/18.1 X |
| 2,620,208 | 12/1952 | Patch et al. | 277/30 X |
| 3,208,289 | 9/1965 | Hutter et al. | 74/18 |
| 3,232,126 | 2/1966 | Pucciarello et al. | 74/18.1 |
| 3,430,995 | 3/1969 | Herbenar et al. | 277/212 FB X |
| 3,449,965 | 6/1969 | Ross | 14/18.2 X |
| 3,468,171 | 9/1969 | Macielinski | 74/18.1 |
| 3,582,091 | 6/1971 | Smith | 277/30 X |
| 3,822,570 | 7/1974 | Fisher | 74/18 X |
| 3,830,838 | 8/1974 | Hadick et al. | 277/212 FB X |
| 4,132,422 | 1/1979 | Saukey et al. | 277/212 FB |

FOREIGN PATENT DOCUMENTS

| 556675 | 2/1960 | Belgium | 277/30 |
|---|---|---|---|
| 1207581 | 12/1965 | Fed. Rep. of Germany | 277/212 FB |
| 1802366 | 10/1969 | Fed. Rep. of Germany | |
| 2362764 | 7/1974 | Fed. Rep. of Germany | 277/212 FB |
| 31191 | 2/1961 | Finland | 277/212 FB |
| 455270 | 10/1936 | United Kingdom | 74/18.2 |

Primary Examiner—Robert S. Ward, Jr.
Attorney, Agent, or Firm—Erwin Salzer

[57] ABSTRACT

A self-aligning seal for minimizing, or entirely suppressing, the flow of a fluid in a direction generally longitudinally of a shaft subjected to axial motions and to tilting motions in any direction. The seal comprises a shaft, a bushing surrounding said shaft, a convoluted diaphragm having radially inner support means affixed to said bushing and radially outer support means affixed to a fixed structure. The bushing has abutment means limiting the relative movement of bushing and shaft. The bushing has preferably externally the shape of a frustum of a cone which facilitates connecting the radially inner end of the convoluted diaphragm to the bushing. The bushing may also be provided with elastomeric sealing means such as an "O" ring precluding the flow of fluid through the narrow gap formed between the shaft and the shaft-receiving bore of the bushing.

3 Claims, 2 Drawing Figures

SELF-ALIGNING SHAFT SEAL

BACKGROUND OF THE INVENTION

The invention solves the problem of providing a fluid-tight, or substantially fluid-tight, partition for shafts whose position under-goes changes in axial, radial or both directions. It is primarily intended for non-rotatable shafts, but may as well be used for rotatable shafts. Its applicability is primarily given in cases of shafts whose ends are supported, but it can also be applied in instances where the ends of the shaft are not supported, but the forces acting on the shaft are of small magnitude.

SUMMARY OF THE INVENTION

A self-aligning shaft according to this invention comprises a shaft, a bushing surrounding said shaft, and a fixed structure defining an aperture. The bushing is arranged in said aperture with a clearance left between the bushing and the fixed structure. The convoluted diaphragm has a radially inner support means and has a radially outer support means for the convoluted wall thereof. The radially inner support means is affixed to the bushing, and the radially outer support means is affixed to the above referred-to fixed structure. The improvement according to this invention comprises a bushing which has the external shape of a frustum of a cone having an external groove therein adjacent the bottom thereof, and a diaphragm the radially inner elastomeric portion of which is of increased thickness and engages said groove.

The radially inner support means are affixed to the bushing and the radially outer support means are affixed to the aforementioned fixed structure.

DESCRIPTION OF PREFERRED EMBODIMENT

Figure 1:
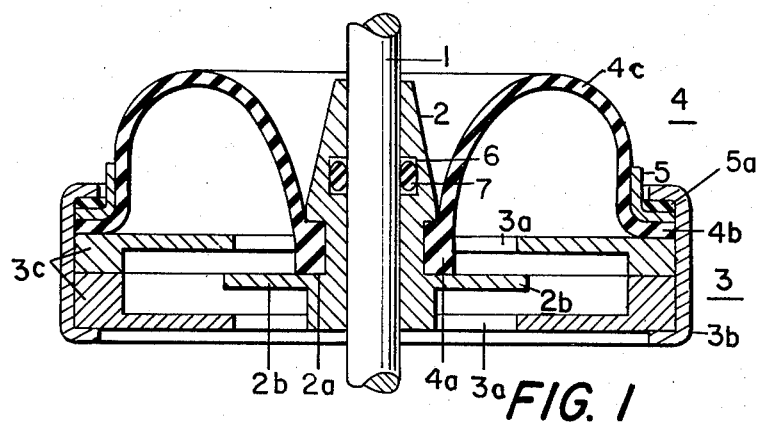
FIG. 1 is a longitudinal section of a self-aligned shaft seal embodying this invention showing the shaft in its normal position.
Figure 2:
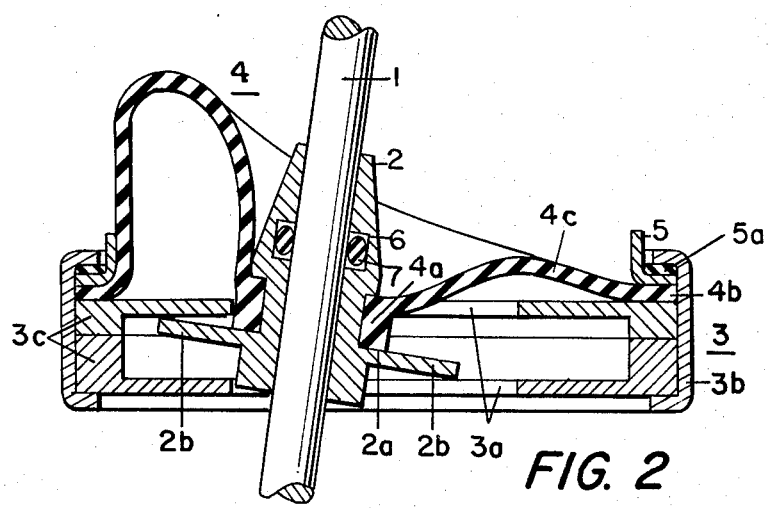
FIG. 2 shows the structure of FIG. 1 in the fashion of FIG. 1 and the shaft in the maximum of its angular displacement allowed by the structure of this invention.

Referring now to the drawings, and more particularly to Figs. 1 and 2 thereof, numeral 1 has been applied to indicate a shaft and numeral 2 has been applied to indicate a bushing surrounding shaft 1. Numeral 3 generally indicates a fixed structure defining two apertures 3a. Bushing 2 is arranged in aperture 3a of plates 3c with a clearance left between bushing 2 and fixed structure 3. Numeral 4 generally indicates a single convolution convoluted diaphragm. Said diaphragm 4 has radially inner clamping flange 4a and radially outer clamping flange 4b for the convoluted wall 4c thereof. The radially inner clamping flange 4a is affixed to bushing 2. This is achieved by means of an external groove 2a in bushing 2 and a radially inner elastomeric portion 4a of diaphragm 4 entering groove 2a. Diaphragm 4 can be expanded in radial direction and is self-contracting since it is largely made of an elastomeric substance. Bushing 2 has the external shape of a frustum of a cone allowing to expand the inner periphery of rolling diaphragm 4 when the latter is affixed to the former so that when sufficiently expanded its elastomeric radially inner portion or clamping flange 4a may snap into groove 2a, and firmly be held therein.

There is a small clearance or gap between any shaft and a bushing surrounding the same through which fluid when under considerable pressure may flow from one side to the other side of the bushing 2. To completely inhibit such a flow of fluid a circular elastomeric sealing body such as, for instance, an "O" ring, may be inserted into said clearance or gap to entirely preclude the flow of fluid from one side of diaphragm 4 to the other side thereof.

Numeral 5a has been applied to indicate an elastomeric annular member surrounding the radially outer clamping flange 4b of rolling diaphragm 4.

The end or clamping flange 4b of diaphragm 4 is clamped in position by metal ring 5, annular elastomeric member 5a and the bent edge of the housing 3b of fixed structure 3. Metal ring 5 includes two flanges enclosing an angle of 90 degrees. One of these flanges prevents ballooning of diaphragm 4 as will be explained below in greater detail.

As is apparent from the above, the fixed structure 3 includes a pair of parallel plates 3c which define the apertures 3a and are clamped against each other with the interposition of parts 5 and 5a by the bent upper and lower edges of housing 3b.

Plates 2b on bushing 2 and plates 3c of fixed structure 3 cooperate as abutments limiting the displacement of bushing 2 relative to shaft 1. Plates 2b project at right angles from bushing 2. Each of plates 3a is arranged in a plane at right angles to the normal position of shaft 1, i.e. to the position thereof shown in Fig. 1. Bushing 2 is further provided with an annular groove 6 accommodating the "O" ring 7 which precludes the flow of fluid along shaft 1 from one side of diaphragm 4 to the other side thereof.

The annular part of ring 5 has the function of preventing ballooning of the rolling diaphragm 4, i.e. a bulbous more or less balloon-shaped expansion of the lateral wall thereof. Such a deformation of rolling diaphragm 4 is most likely to occur at the portion of diaphragm 4 shown to the left of Fig. 2. The angular cross-section of part 5 and more particularly its vertical flange has the tendency of preventing ballooning of diaphragm 4. To this end the height of the vertical flange of part 5 may be increased, as desired. It may be almost as high as the left side of the rolling wall of diaphragm 4, shown in Fig. 2.

Under extremely onerous conditions it may be desirable to clamp part 4a of diaghragm 4 by an annular member arranged parallel to the plane defined by plate 2b into groove 2a. This member has not been shown in the drawings, and it can ordinarily be safely deleted.

The rolling diaphragms shown in Figs. 1 and 2 may be all of rubber, or all of an elastomeric material, or be of the fabric reinforced type.

I claim as my invention:
1. A self-aligning shaft seal comprising
   (a) a shaft;
   (b) a bushing surrounding said shaft;
   (c) a fixed structure defining an aperture, said bushing being arranged in said aperture with a clearance left between said bushing and said fixed structure;
   (d) a convoluted diaphragm having radially inner support means and having radially outer support means for the convoluted wall thereof;
   (e) said radially inner support means being affixed to said bushing;

(f) said radially outer support means being affixed to said fixed structure; and wherein (g) said bushing has the external shape of a frustum of a cone having an external groove therein adjacent the bottom thereof, and wherein said diaphragm has a radially inner elastomeric portion of increased thickness engaging said groove.

2. A shaft seal as specified in claim 1 wherein said groove is bounded on one side thereof by plate means adapted to engage said fixed structure to limit the movement of said bushing relative to said shaft.

3. A shaft seal as specified in claim 1 wherein said bushing having the external shape of a frustum of a cone is provided with an internal groove accommodating an "O" ring.

* * * * *